Figure 1:
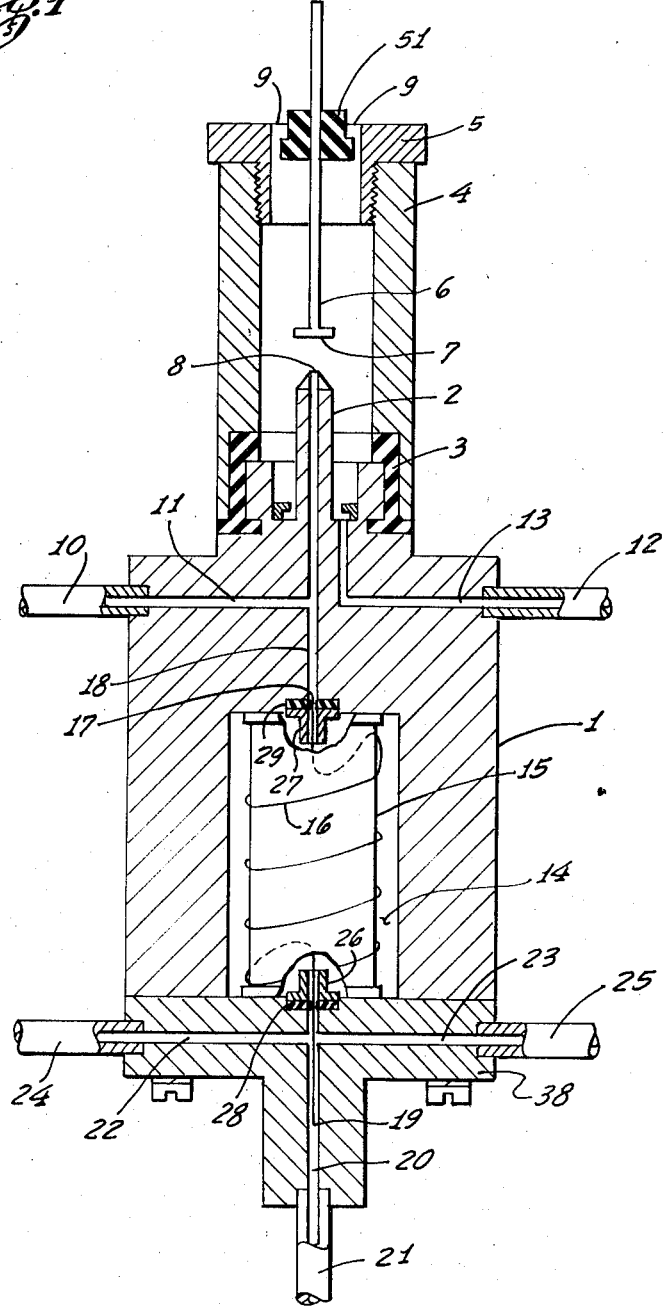

United States Patent
Hofmann

[15] 3,690,146
[45] Sept. 12, 1972

[54] DEVICE FOR METERING A PARTICULAR QUANTITY OF FLUID

[72] Inventor: Kurt Hofmann, Hergershausen, Germany

[73] Assignee: Hartmann & Braun, Aktiengesellschaft, Frankfurt/Main, Germany

[22] Filed: Aug. 30, 1971

[21] Appl. No.: 175,918

[30] Foreign Application Priority Data

Sept. 10, 1970 Germany..........P 20 44 772.7

[52] U.S. Cl. ....................73/23.1, 324/33, 23/254 E, 73/422 GC
[51] Int. Cl. ......G01n 1/22, G01n 31/08, G01n 31/12
[58] Field of Search .......73/23, 23.1, 421.5, 422 GC; 23/254 EF; 324/33; 250/41.9 S; 137/240

[56] References Cited

UNITED STATES PATENTS 3,240,052   3/1966   Reinecke et al............73/23.1

FOREIGN PATENTS OR APPLICATIONS 954,067   4/1964   Great Britain ........73/422 GC

OTHER PUBLICATIONS

Condon " Design Considerations of a Gas Chromatography System Employing High Efficiency Golay Columns," Analytical Chemistry, Vol. 31, No. 10, October, 1959, pp. 1717 to 1722.

Primary Examiner—Richard C. Queisser
Assistant Examiner—C. E. Snee, III
Attorney—Ralph H. Siegemund

[57] ABSTRACT

Device for metering a particular quantity of fluid flowing into a particular duct; a capillary tube having inlet extending into the duct; first and second duct means respectively leading to and from the particular duct downstream from the capillary inlet, an auxiliary fluid flows into the first duct means and is discharged again through the second duct means together with fluid flowing in the particular duct and not having entered the capillary; and means are provided for obtaining pressure regulation of the auxiliary fluid as passing through the first and second duct means to obtain constant pressure head at inlet of the capillary tube.

9 Claims, 2 Drawing Figures

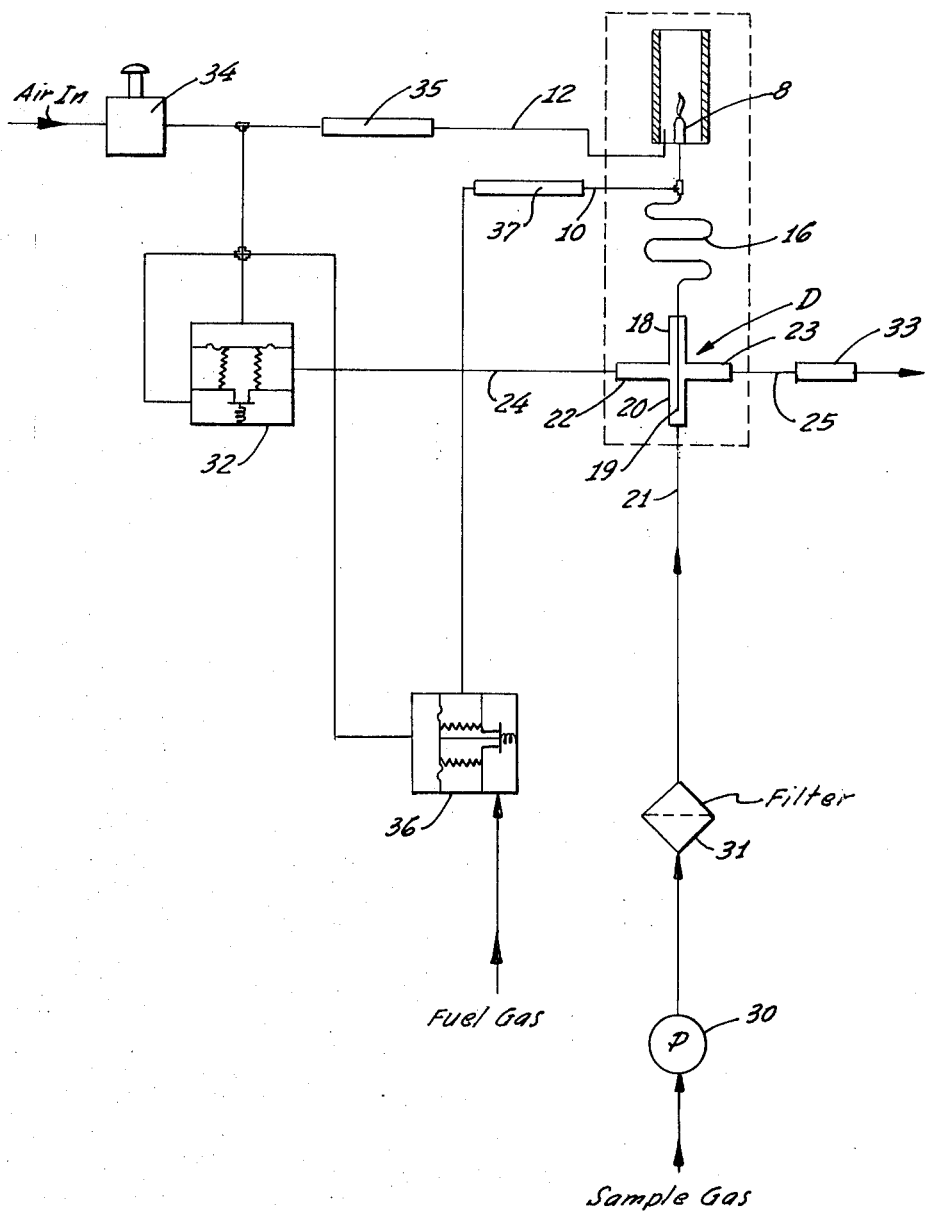

DEVICE FOR METERING A PARTICULAR QUANTITY OF FLUID

The present invention relates to a metering device for a fluid to be used, for example, in analyzing instruments and employing particularly a capillary tube for the medium to be metered.

Flame ionization detectors are used, for example, for analyzing the exhaust gas of internal combustion engines. For this it may be required to feed gas as sampled from the exhaust pipe to the instrument without delay and without cooling. The conventional metering devices, cooperating with pressure regulators in the range of 1 to 1.6 atmospheres pressure for the sample gas and tapping a particular quantity of sample gas, are hardly suitable for metering hot exhaust fumes. Particularly, these regulators use frequently a plastic diaphragm which will not resist these high temperatures prevailing in the exhaust pipe. Moreover, the diaphragm may even change the composition of the sample gas in that they become effective analogous to the stationary phase of a separator column as used in gas chromatography; the measuring results will be erroneous accordingly. Moreover, these known metering devices actually do introduce significant delay due to a relative large gas column involved.

It is an object of the present invention to provide for a fluid metering device to be used in fluid analyzing instruments which are free from the deficiencies outlined above, and which particularly remain properly operable even at higher temperatures and even if the sample gas contains, e.g., chemically agressive components.

In accordance with the preferred embodiment of the present invention, it is suggested to provide a metering capillary tube having an inlet opening that extends into the feeder duct or conduit for the medium to be metered. A transverse flow path is provided downstream from this inlet for sustaining a cross flow of an auxiliary fluid under constant pressure conditions so as to maintain the pressure head at the capillary inlet constant in spite of possible variations in the flow into the feeder duct. Fluid from the feeder duct that does not enter the capillary tube, is discharged from the system together with the auxiliary fluid.

In the preferred form of practicing the invention, the metering device is included in the sample gas input path for a flame ionization detector. Such a detector will include pneumatic regulation for the fuel gas flow, the regulator being operated by a source of constant air pressure from which also is derived the air that is needed to sustain combustion in the burner of the flame ionization detector. The auxiliary gas for the metering device is preferably air, derived also from that source of constant air pressure, via a regulator that is likewise operated by the constant pressure source.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates a section view of a flame ionization detector improved in accordance with the preferred embodiment of the present invention; and FIG. 2 shows schematically the various gas feeder paths, including the novel metering device in one of them, for the instrument shown in FIG. 1.

Proceeding now to the detailed description of the drawings, in FIG. 1 thereof is illustrated a flame ionization detector having a base element 1 made of corrosion proof metal. A burner nozzle 2 extends upwardly from base 1 and ends in a nozzle opening 8 at the tip. The nozzle is contained in a metal tube 4, the tube being electrically insulated from the metal base 1 by member 3.

Tube 4 is closed at the top by a cover 5 having a central opening, and an electrically insulative insert 51 convers that opening. The insert 51 serves as insulative holder for an electrode 6 having a particular surface 7 that faces burner nozzle tip 8. The electrode 6 is electrically connected external to the burner as is conventional for flame ionization detectors. Openings 9 provide for exhaust from the burner chamber that is the interior of tube 4.

Several different gas paths lead into and through the base. First of all, burner 2 has an internal duct that is connected to a pipe 10 via a duct 11 in base 1, for feeding a combustible or fuel gas to the burner; hydrogen is preferably used here. Next, a pipe 12 is continued in base 1 in duct 13. Duct 13 terminates in the burner chamber below the nozzle, and feeds air thereto as needed for sustaining combustions. The air flows up and around the nozzle and discharges with exhaust-gases from the burner through the openings 9. The sample gas is fed into a duct 18 that continues in the burner nozzle duct, duct 11 merges therewith in the base. The sample gas is now metered in a manner to be described next.

A cover plate 38 is bolted to the bottom of base 1 for covering a relatively wide central bore 14 of the base. A hollow but closed cylindrical body 15 is disposed in bore 14, and a capillary, preferably flexible tubing 16 is helically wound onto that cylinder. This metering capillary has its two ends run into the interior of cylinder 15, close to the axial end faces thereof, and they exit therefrom respectively at these upper and lower axial end faces. The upper end or outlet 17 of capillary tube 16 leads into the duct 18 of the base which is the downward continuation of the burner duct. The lower end or inlet 19 of capillary tube 16 extends into a duct 20 of cover plate 38. A pipe 21 is continued in that duct 20; the sample gas is fed to the instrument via that pipe 21. The sampled gas that has traveled through capillary 16 leaves same at outlet 17 as inserted in duct 18 and enters that duct wherein it mixes with the combustible fuel gas that is fed into duct 11. Winding the capillary onto a cylinder was found particularly advantageous for temperature control. The base 1 may include a heating device and temperature sensing means (not shown) to establish a constant temperature for the sample gas.

The sample gas feeder path includes the particular novel metering structure. Only a small portion of that gas enters capillary 16, the remainder is discharged as follows. The cover plate 38 has two transverse ducts 22 and 23 which branch off duct 20 but above the location of the inlet 19 of the capillary at about 2 cm distance therefrom. In other words, the ducts 22–23 cross the duct 20 downstream (as to sample gas flow) from inlet 19 of the capillary tube 16. An auxiliary gas is applied through a pipe 24 and the flow path thereof continues in duct 22. The flow path for the auxiliary gas crosses duct 20 and continues in duct 23. Duct 23 is connected to the auxiliary gas exhaust pipe 25 for discharge of all the auxiliary gas from the system. The discharge flow through conduit path 23-25 includes also that portion of the sample gas which did not enter the capillary tube 16.

Nipple elements 26 and 27 are provided for proper positioning and feed-through of the two capillary ends through the two axial end faces of cylinder 15. Nipple 26 is inserted in an indentation provided for this purpose in cover plate 38 and in alignment with duct 20. Nipple 27 is correspondingly inserted in an indentation in the top wall of chamber 14 and is aligned with duct 18. Sealing elements (washers) 28 and 29 are respectively interposed for inhibiting any gas conduction from ducts 20, 22, 23, through hollow cylinder 15 into duct 18.

The ducts 20, 22 and 23 in combination with capillary tube 16 establish the metering device, collectively denoted by letter D in FIG. 2. The function of the metering device D in conjunction with the several gas supply paths for the analyzer, as shown in FIG. 2, will be explained next; similar reference numerals in the two figures do refer to similar parts.

It is presumed representatively that the flame ionization detector is used for determining the hydrocarbon content of the exhaust fumes of an internal combustion engine. The hot sample gas, therefor, is taken from the (or one) exhaust pipe of the engine and drawn by means of a pump 30. The gas passes through filtering device 31 to the detector, the path from the filtering device is the pipe 21. These connecting parts as between engine exhaust pipe and sample gas inlet of the analyzer can be made from corrosion and age proof material so that they readily resist the high temperature of the sample gas and do not contribute additive components thereto.

The auxiliary gas as fed to pipe 24 is air, and this particular air supply is controlled by a conventional diaphragm pressure regulator 32. The regulated air flow traverses the duct 22, crosses duct 20, continues through duct 23 and out of the system via pipe 25 and a choke 33. The discharge flow includes the residual sample gas. Regulator 32 receives air from a constant pressure source 34 which, in turn, receives air from a suitable supply. Air is needed by regulator 32 two-fold. Once for purpose of control actuation of the regulator 32 and additionally air is needed that is being regulated, the latter air is fed into duct 22 as described. The constant pressure source provides also air to the air feeder line 12 of the detector to sustain combustion therein, there being a capillary to be interposed schematically shown in FIG. 2 as fluid impedance 35. A filtering device may be included in the path that leads to line 12 to clean the air from components which may detrimentally influence accuracy and sensitivity of the ionization detector. In particular, hydrocarbons have to be removed in the present case. Finally, constant air pressure from source 34 is provided to the control input of a diaphragm regulator 36, controlling the supply of fuel gas to inlet pipe 10. The fuel gas line includes also a fluid impedance (capillary) 37. The several gas streams are ultimately adjusted by proper adjustment of constant pressure regulator 34 and of the output of pump 30.

The instrument operates as follows. Fuel gas and combustion air are fed to the burner as is conventional for flame ionization detectors. Sample gas enters duct 20 and a small portion of that gas flow through inlet 19 into the capillary feeder tube. The metering process for the sample gas, i.e., the flow rate through the capillary, operates on basis of maintaining the pressure head at the entrance 19 of capillary tube 16 very accurately constant, even if the output rate of pump 30 varies. Instrumental here is the operation of pressure controller and regulator 32. The regulator operates in response to load pressure in its output path, and that pressure is determined also by action of pump 30 for the sample gas, because the ducts 22-23 and 20 cross.

Assuming the pump output drops (rises), regulator 32 will now increase (decrease) auxiliary gas, i.e., air, to maintain constant load pressure for the regulator at its output side. Accordingly, the pressure head at the inlet 19 of the capillary does remain constant. The position of inlet 19 is chosen off the flow path of the auxiliary gas so that auxiliary gas does not enter the capillary. Thus, the inflow of sample gas does remain constant. The variation in the supply of sample gas is taken up by the outflow of sample gas mixed with auxiliary gas through duct 23.

By way of example, as was actually practiced successfully, sample gas was fed to the system at an (average) rate of 1,000 liters per hour (about 17 liters per minute). Of this 5 cm$^3$ per minute flowed into and through the capillary tube, the remainder flowed off through duct 23 and discharge pipe 25. The auxiliary gas flow was about 50 liters per hour. The ducts 20, 22, and 23 had diameter of about 1 to 2 mm, i.e., they were quite narrow. Accordingly, the flow speeds set up here are quite high and the several gas molecules pass through very rapidly. Consequently, the metering device responds rapidly to variations in the sample gas flow rate an provides practically instantaneous compensating action, so that the pressure at inlet 19 does in fact remain constant.

In an alternative example, the regulator 32 could be connected at the discharge side (duct 23, pipe 25) of the metering system. As far as pressure control is concerned, the action would be analogous. However, in this case hot sample gas would pass also through the regulator and that is not desirable from standpoint of engineering. It will also be apparent that the principles involved permit operation for metering liquid flow.

The instrument as improved in accordance with the invention will find utility also in gas chromatography. Here then, the capillary 16 may be pretreated to serve as separator column. The metering device, thus, charges that column at the desired constant rate. While not exclusively used for detection, the flame ionization detector can also be used here to detect the separated component leaving outlet 17.

The invention is not limited to the embodiments described above but all changes and modifications thereof not constituting departures from the spirit and scope of the invention are intended to be included.

I claim:

1. Device for metering a particular quantity of fluid, the fluid flowing into a particular duct, comprising, a capillary tube having inlet and outlet, the inlet extending into said particular duct;

first and second duct means respectively leading to and from the particular duct downstream from the capillary inlet;

means for supplying an auxiliary fluid to the first duct means, so that the auxiliary fluid as so supplied is discharged again through the second duct means together with fluid flowing in the particular duct and not having entered the capillary inlet; and means for obtaining pressure regulation of the auxiliary fluid as passing through the first and second duct means to obtain constant pressure head at inlet of the capillary tube.

2. Device as in claim 1, the auxiliary fluid being air.

3. Device as in claim 2, and including a cylindrical body, the capillary tube being wound onto the cylinder, leading into the cylinder near the two axial end faces thereof and leaving the cylinder through the axial end faces.

4. Device as in claim 3, the cylindrical body being in particular alignment with the particular duct so that one end of the capillary tube as passing through one end face of the cylindrical body extends into the particular duct.

5. Device as in claim 1, the particular duct passing sample gas, a flame ionization detector having a burner connected to the outlet side of the capillary.

6. Device as in claim 5, the flame ionization detector including third duct means for fuel gas and fourth duct means for air for combustion, a constant pressure source for air, feeding air to the fourth duct means and to the means for obtaining pressure regulation, the third duct means including a regulator for fuel gas flow, operated by the constant pressure source.

7. Device as in claim 5, the capillary tube being a separator column for gas chromatography.

8. Device as in claim 1, the capillary tube being a separator column for gas chromatography.

9. Device as in claim 1, the outlet of the capillary tube leading to a fluid detector for analyses.

* * * * *